United States Patent
Wang et al.

(10) Patent No.: US 8,234,454 B2
(45) Date of Patent: Jul. 31, 2012

(54) METHOD AND SYSTEM OF NUMERICAL ANALYSIS FOR CONTINUOUS DATA

(75) Inventors: Hsin-Te Wang, HsinChu (TW);
Wen-Ben Wang, HsinChu (TW)

(73) Assignee: Altek Corporation, HsinChu (TW)

( * ) Notice: Subject to any disclaimer, the term of this patent is extended or adjusted under 35 U.S.C. 154(b) by 316 days.

(21) Appl. No.: 12/646,311

(22) Filed: Dec. 23, 2009

(65) Prior Publication Data

US 2011/0022806 A1 Jan. 27, 2011

(30) Foreign Application Priority Data

Jul. 21, 2009 (TW) ............................... 98124542 A

(51) Int. Cl.
*G06F 12/06* (2006.01)

(52) U.S. Cl. .. 711/137; 711/135; 711/154; 711/E12.057

(58) Field of Classification Search .................. 711/137, 711/154, E12.001, E12.002, 135, 118, E12.057; 345/473, 545
See application file for complete search history.

(56) References Cited

U.S. PATENT DOCUMENTS

| 5,007,005 A | * | 4/1991 | Hatakeyama et al. | ........ 345/473 |
| 2002/0067858 A1 | * | 6/2002 | Lazaridis | ...................... 382/228 |

* cited by examiner

Primary Examiner — Pierre-Michel Bataille
(74) Attorney, Agent, or Firm — Muncy, Geissler, Olds & Lowe, PLLC

(57) ABSTRACT

A method of numerical analysis for continuous data includes: providing a temporary storage block, fetching a plurality of data units sequentially from continuous data to store in the temporary storage block, conducting an analysis step wherein each data unit is analyzed sequentially based on all the data units stored in the temporary storage block, recording the analysis result, performing an OR operation on the analysis result of each of the data units and the corresponding previous analysis result, and determining whether the end of the continuous data has been reached. If so, the method terminates. If not, the first of the data units is removed, the next data unit from the continuous data is fetched, and the analysis step is returned to. The method can be implemented in hardware with less temporary storage space and read/write overheads. A system of numerical analysis for continuous data is also provided.

8 Claims, 4 Drawing Sheets

METHOD AND SYSTEM OF NUMERICAL ANALYSIS FOR CONTINUOUS DATA

CROSS REFERENCE TO RELATED APPLICATIONS

This application claims priority of Application No. 098124542 filed in Taiwan, R.O.C. on Jul. 21, 2009 under 35 U.S.C. §119.

BACKGROUND OF THE INVENTION

1. Field of the Invention

The present invention relates to a method and system of numerical analysis for continuous data, more particularly to a method and system of numerical analysis for continuous data suitable to be implemented in hardware.

2. Description of the Related Art

Some of the algorithms are specifically dedicated to analyzing the numerical change of continuous data in preparation for the subsequent processing of the continuous data. For example, individual sections of the continuous data may be identified where each section is to be processed with a different algorithm. Prior art analysis methods for numerical change typically require searching the data forwardly and backwardly to proceed with a relevant decision.

For example, referring to FIG. 1, the numerical change of the continuous data is shown by the curve in FIG. 1, wherein the data section between time T1 and T4 is a target section to be further processed. In order to identify the target section, a prior art algorithm identifies a point of the data curve greater than a high threshold Hth (such as at time T2), and therefrom searches backwardly (as shown by the direction of the arrow D1) for another point of the data curve equal to a low threshold Lth (such as at time T1) and marks its coordinates. Then, upon moving forwardly, when a point of the data curve smaller than the high threshold Hth (such as at time T3) is encountered, therefrom the prior art algorithm searches forwardly (as shown by the direction of the arrow D2) for another point of the data curve equal to the low threshold Lth (such as at time T4), and marks its coordinates. Based on the above algorithm, the target section of the continuous data can be identified.

Although the aforementioned numerical analysis method can be implemented easily in software, the processing speed is slower and the processing throughput is lower; therefore, it may not be able to meet the requirements of real time system applications. If the aforementioned numerical analysis method is implemented in hardware, then the step of searching the data forwardly and backwardly would cause a larger temporary storage and read/write overheads. Such implementation not only increases hardware cost, but also decreases the processing throughput.

Therefore, a method of numerical analysis for continuous data without searching data forwardly and backwardly and hence suitable to be implemented in hardware is highly desirable.

SUMMARY OF THE INVENTION

The present invention is directed to providing a method and system of numerical analysis for continuous data. In particular, a portion of the continuous data is obtained and stored in a relatively smaller temporary storage block for numerical analysis, and a unidirectional search is performed on the continuous data to update the data stored in the temporary storage block. As a result, the present invention may complete numerical analysis on the continuous data at lower hardware cost, and higher throughput.

According to one embodiment, a method of numerical analysis for continuous data includes: providing a temporary storage block; fetching a plurality of data units from continuous data sequentially to store in the temporary storage block; conducting an analysis step in which each of the data units in the temporary storage block is analyzed sequentially based on all the data units in the temporary storage block, the analysis result is recorded, and an OR operation is performed on the analysis result of each of the data units and the corresponding previous analysis result; determining whether the end of the continuous data has been reached; if so, the method terminates; if not, removing the first of the data units from the temporary storage block, fetching the next data unit from the continuous data, and returning to the analyzing step.

According to another embodiment, a system of numerical analysis for continuous data includes a temporary storage, a storage element and a controller. The temporary storage is used for storing a plurality of data units. The storage element is used for storing at least an analysis result. The controller is electrically connected to the temporary storage and the storage element for fetching a plurality of data units from continuous data sequentially to store in the temporary storage, sequentially analyzing each of the data units in the temporary storage based on all the data units in the temporary storage, storing the analysis result to the storage element, and performing an OR operation on the analysis result of each of the data units and the corresponding previous analysis result.

DETAILED DESCRIPTION OF THE INVENTION

The objectives, technical contents and characteristics of the present invention can be more fully understood by reading the following detailed description of the preferred embodiments, with reference made to the accompanying drawings.

Figure 2:
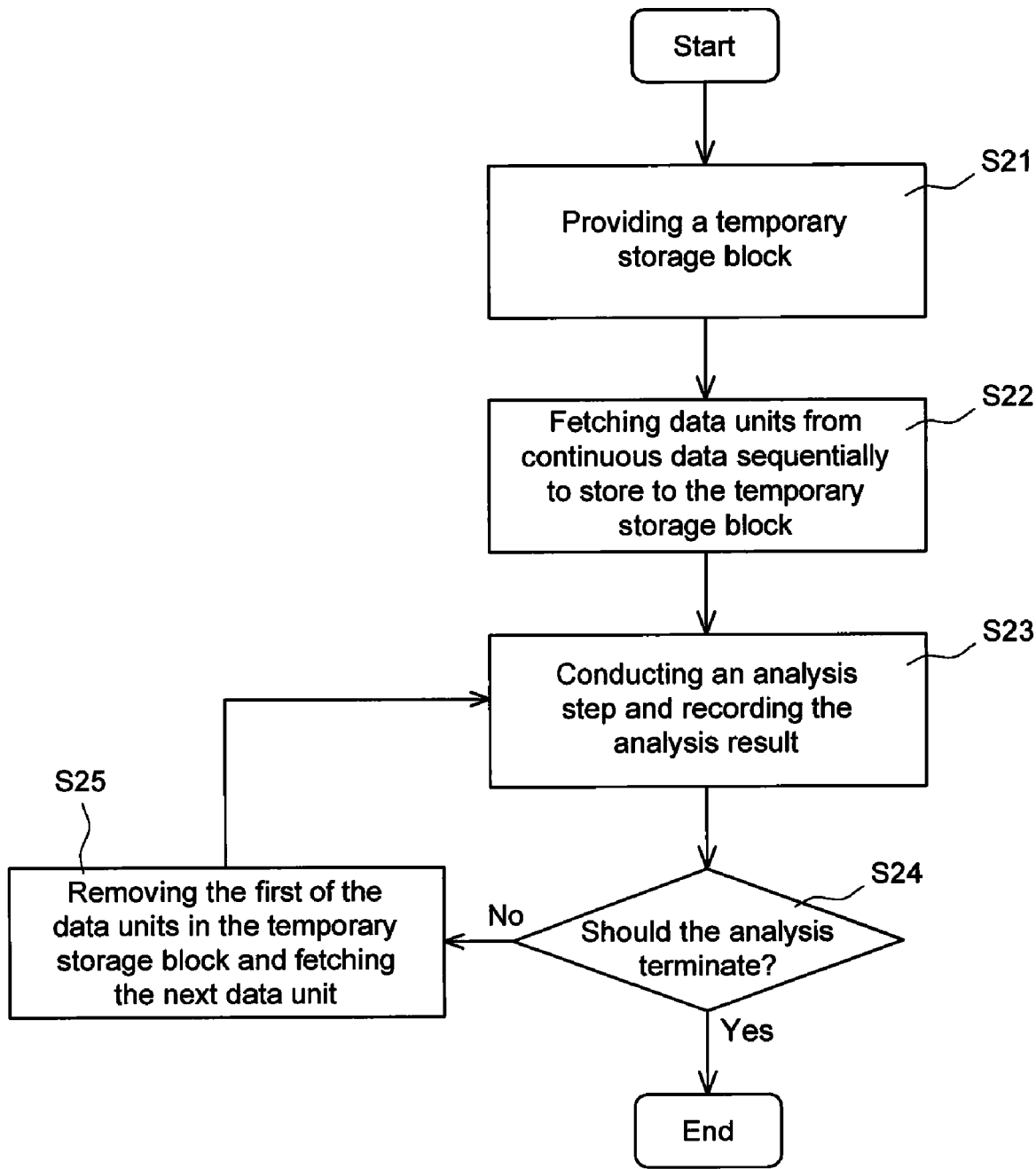
FIG. 2 is a flow chart diagram schematically illustrating the method of numerical analysis for continuous data according to one embodiment of the present invention.

Referring to FIG. 2, the method of numerical analysis for continuous data according to one embodiment of the present invention is suitable to be implemented in hardware. The method according to the embodiment includes: providing a temporary storage block (S21), wherein according to an embodiment, the temporary storage block operates under the rule of first in first out (FIFO); fetching a plurality of data units from continuous data sequentially to store in the temporary storage block (S22); conducting an analysis step in which the first of the data units in the temporary storage block is analyzed based on all the data units in the temporary storage block, and the analysis result is recorded (S23); determining whether the end of the continuous data has been reached (S24); if so, the method terminates; if not, removing the first of the data units from the temporary storage block, fetching the next data unit from the continuous data (S25), and returning to the analysis step (S23). The steps S23 to S25 are repeated until numerical analysis for the continuous data is completed.

Figure 1:
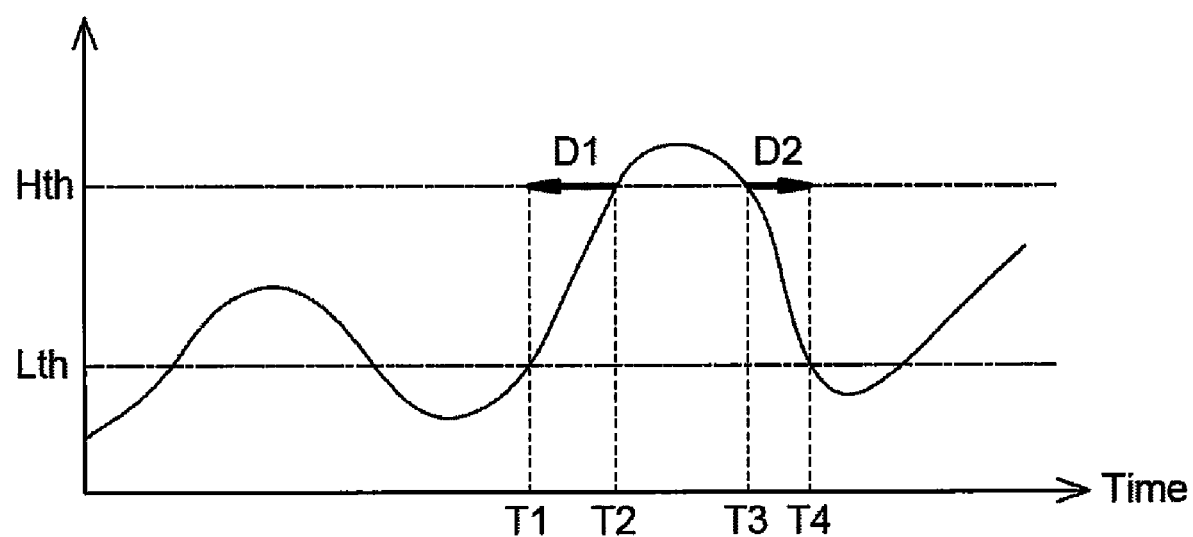
FIG. 1 is a diagram schematically illustrating a prior art numerical analysis method.
Figure 3:
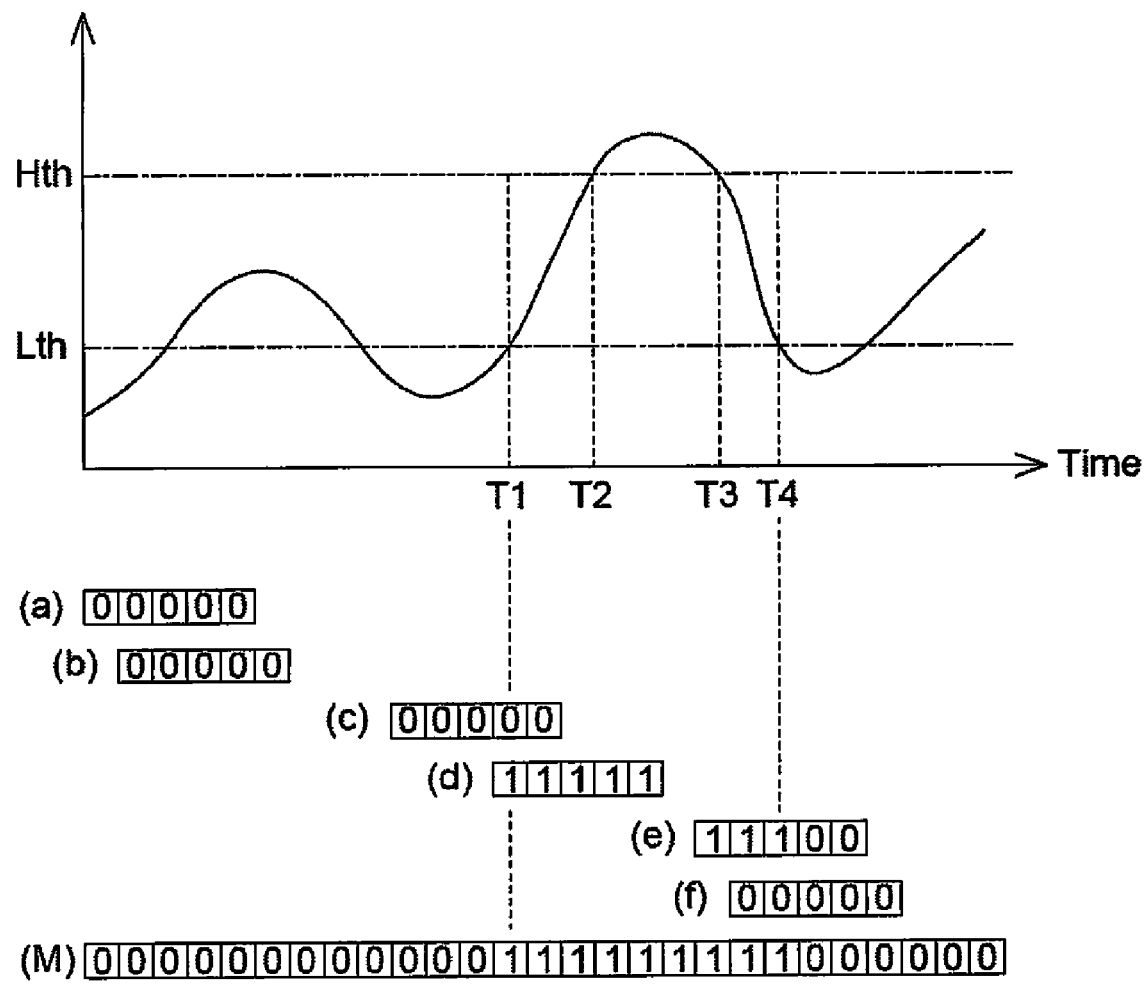
FIG. 3 is a diagram schematically illustrating the method of numerical analysis for continuous data according to one embodiment of the present invention.

According to one embodiment, in the step S23, each of the data units in the temporary storage block is analyzed sequentially, and the analysis result of each of the data units is processed by an OR operation with the corresponding previous analysis result. Referring to FIG. 3, the numerical analysis method for continuous data according to the exemplary embodiment is illustrated with the continuous data shown in FIG. 1. The blocks labeled (a) through (f) represent different analysis results in the temporary storage block, e.g. a first in first out (FIFO) buffer, corresponding to different sections of the continuous data. The block labeled (M) represents a storage element for storing the analysis result, wherein each slot associates with the corresponding time slot of each data unit.

In continuation to the foregoing description, first, each data unit is fetched sequentially from the continuous data to fill the temporary storage block, and the data units in the temporary storage block are analyzed to determine if they are from a target section. If all of the data units in the temporary storage block are not greater than a high threshold Hth, the corresponding slot of the data units in the temporary storage block do not need to be marked and are assigned 0 as indicated by label (a). The analysis result is recorded in the storage element labeled (M). Then, the first of the data units in the temporary storage block is removed, and the next data unit is fetched from the continuous data, and the data units in the temporary storage block are analyzed. Similarly, they are not greater than the high threshold Hth, and hence, do not need to be marked, as indicated by label (b). In such manner, portions of the continuous data are obtained and analyzed sequentially. Although the temporary storage block indicated by label (c) includes the data unit at time T1, the data in the temporary storage block are still not greater than the high threshold Hth, and therefore marking is still not needed.

Then, since the temporary storage block indicated by label (d) includes the data unit at time T2 and the data unit at time T1, the corresponding slot of the data units in the temporary storage block are marked. All of the following data units obtained are greater than the high threshold Hth and are marked until label (e) has been reached. The temporary storage block indicated by label (e) includes the data units at time T3 and time T4, and therefore, the data units before time T4 are marked and the data units after time T4 are not marked.

As the subsequent data units are fetched from the continuous data, the data units in the temporary storage block may include the data unit at time T4 but not the data unit at time T3, and therefore, the analysis result is all 0, as indicated by label (f). However, when an OR operation is performed at the corresponding slots of the analysis result labeled (f) and the previous analysis result, the data unit at time T4 is still marked. In other words, the analysis result labeled (e) is processed by an OR operation with the analysis result labeled (f) in this embodiment.

The above-mentioned steps are repeated until the end of the continuous data has been reached and the analysis result is shown in the block labeled (M), where all the data units between time T1 and time T4 are marked. Subsequently, the analysis result in the storage element can be used for different applications such as being further processed with different algorithms in real time system applications. According to one embodiment, the analysis result of each data unit includes the coordinates of each data unit.

Figure 4:
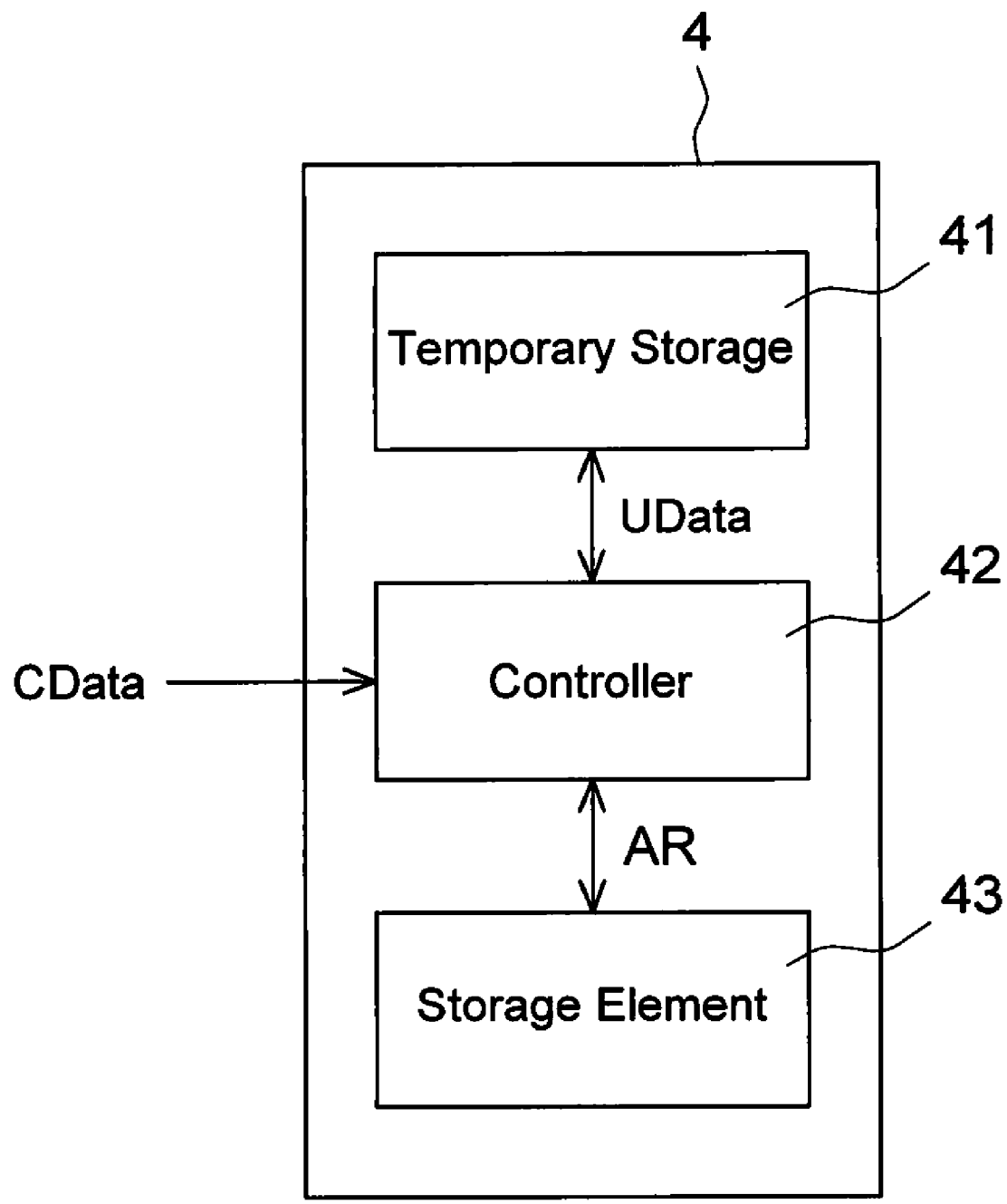
FIG. 4 is a diagram schematically illustrating the system of numerical analysis for continuous data according to another embodiment of the present invention.

Referring to FIG. 4, the system of numerical analysis for continuous data according to one embodiment includes a temporary storage 41, a storage element 43 and a controller 42. The temporary storage 41 is used for storing a plurality of data units (UData). The storage element 43 is used for storing the analysis result (AR). The controller 42 is electrically connected with the temporary storage 41 and the storage element 43 so as to fetch a plurality of data units (UData) from continuous data (CData) to store in the temporary storage 41, analyze the first of the data units (UData) in the temporary storage 41 based on all the data units (UData) stored in the temporary storage, and record the analysis result (AR) in the storage element 43.

According to one embodiment, in addition, the controller 42 analyzes each data unit (UData) in the temporary storage 41 sequentially, and the analysis result of each data units (UData) is processed by an OR operation with the corresponding previous analysis result. Detail description has been mentioned previously and would be omitted here.

According to one embodiment, the method and system of numerical analysis for the continuous data can be applied to analyzing image data. For example, an image capturing device (e.g. digital camera, camera phone, personal digital assistant, etc.) captures an image signal with the image detecting component through lens, and transmits the image signal to a display unit to display it. Before the image signal is transmitted to the display unit, it may be analyzed numerically and compensated to different degrees or with different algorithms for a better displaying effect. The method of numerical analysis of the present invention performs a unidirectional search on the image data and treats a pixel or an image block as a data unit to perform the analysis. Therefore, the method of numerical analysis of the present invention is suitable to be implemented in hardware with less temporary storage space and read/write overheads. In other words, based on the foregoing embodiments, implementing the present invention in hardware not only can lower hardware cost, but also can maintain a better processing throughput, thereby satisfying requirements of real time system applications.

In conclusion, the method and system of numerical analysis for continuous data according to the present invention temporarily stores a portion of the continuous data to the temporary storage block so as to perform numerical analysis, and searches the continuous data unidirectionally so as to update the data in the temporary storage block. Therefore, the present invention achieves numerical analysis for continuous data with relatively less temporary storage space and read/write overheads, which results in lower hardware cost and better processing throughput.

The embodiments described above are to demonstrate the technical contents and characteristics of the preset invention to enable the persons skilled in the art to understand, make, and use the present invention. However, it is not intended to limit the scope of the present invention. Therefore, any equivalent modification or variation according to the spirit of the present invention is to be also included within the scope of the present invention.

What is claimed is:

1. A method of numerical analysis for continuous data comprising:
   providing a temporary storage block;
   fetching a plurality of data units from continuous data sequentially to store in the temporary storage block;
   conducting an analysis step in which each of the data units in the temporary storage block is analyzed sequentially based on all the data units in the temporary storage block, the analysis result is recorded, and an OR operation is performed on the analysis result of each of the data units and the corresponding previous analysis result;

determining whether the end of the continuous data has been reached;

if so, the method terminates;

if not, removing the first of the data units from the temporary storage block, fetching the next data unit from the continuous data, and returning to the analysis step.

2. The method of numerical analysis for continuous data according to claim 1, wherein the temporary storage block operates under the rule of first in first out.

3. The method of numerical analysis for continuous data according to claim 1, wherein the analysis result comprises the coordinates of the data unit.

4. The method of numerical analysis for continuous data according to claim 1, wherein the continuous data comprises an image.

5. A system of numerical analysis for continuous data comprising:

a temporary storage for storing a plurality of data units;

a storage element for storing at least one analysis result;

a controller electrically connected to the temporary storage and the storage element for fetching a plurality of data units from continuous data sequentially to store in the temporary storage, sequentially analyzing each of the data units in the temporary storage based on all the data units in the temporary storage, storing the analysis result to the storage element, and performing an OR operation on the analysis result of each of the data units and the corresponding previous analysis result.

6. The system of numerical analysis for continuous data according to claim 5, wherein the temporary storage is a first in first out buffer.

7. The system of numerical analysis for continuous data according to claim 5, wherein the analysis result comprises the coordinates of the data units.

8. The system of numerical analysis for continuous data according to claim 5, wherein the continuous data comprises an image.

* * * * *